United States Patent
Mark et al.

(10) Patent No.: US 7,251,214 B2
(45) Date of Patent: Jul. 31, 2007

(54) SYSTEM AND METHOD FOR PROVIDING PROTECTION OF DATA COMMUNICATIONS IN PACKET-BASED NETWORKS

(75) Inventors: Barry Ding Ken Mark, Stittsville (CA); Thomas George Zboril, Mississauga (CA)

(73) Assignee: Tropic Networks Inc., Ottawa (CA)

( * ) Notice: Subject to any disclaimer, the term of this patent is extended or adjusted under 35 U.S.C. 154(b) by 1189 days.

(21) Appl. No.: 10/193,129

(22) Filed: Jul. 12, 2002

(65) Prior Publication Data

US 2003/0179749 A1 Sep. 25, 2003

(51) Int. Cl.
- H04L 1/00 (2006.01)
- H04L 12/66 (2006.01)
- H04L 12/56 (2006.01)
- H04J 3/24 (2006.01)

(52) U.S. Cl. .................. 370/219; 370/356; 370/389; 370/392; 370/400; 370/473

(58) Field of Classification Search .............. None
See application file for complete search history.

(56) References Cited

U.S. PATENT DOCUMENTS

| | | | | |
|---|---|---|---|---|
| 6,052,373 | A * | 4/2000 | Lau | 370/399 |
| 6,597,656 | B1 * | 7/2003 | Blanc et al. | 370/219 |
| 6,751,219 | B1 * | 6/2004 | Lipp et al. | 370/390 |
| 6,876,660 | B1 * | 4/2005 | Hughes et al. | 370/395.4 |
| 6,895,024 | B1 * | 5/2005 | Drake et al. | 370/536 |
| 6,975,587 | B1 * | 12/2005 | Adamski et al. | 370/217 |

* cited by examiner

*Primary Examiner*—Chi Pham
*Assistant Examiner*—Melanie Jagannathan
(74) *Attorney, Agent, or Firm*—Victoria Donnelly (57) ABSTRACT

A method and system for providing protection of data communications in packet-based networks is provided, using a combination of unicast to multicast conversion and providing formation of virtual output queues (VOQs) which are separate for each pair of the target port and protection ports on the target network device. As a result, the system requires less bandwidth resources and reduces or eliminates network performance problems associated with other existing solutions.

22 Claims, 7 Drawing Sheets

SYSTEM AND METHOD FOR PROVIDING PROTECTION OF DATA COMMUNICATIONS IN PACKET-BASED NETWORKS

FIELD OF THE INVENTION

The invention relates to telecommunications networks, and, in particular, to the protection of data communications in packet-based networks.

BACKGROUND OF THE INVENTION

Protection of data communications is a critical feature of modern telecommunications networks to ensure safe and reliable data transmission in the event of the failure of a network component. In older Time Division Multiplexed (TDM) networks, various methods for protection were used. An effective method of protection in TDM networks is 1+1 line protection, where, in addition to the first line used to carry voice signals, a second line is used to provide redundancy in the case of a failure in the first line. The first line is called the working line, and the second line is called the protection line. However, this type of protection cannot be applied directly to packet-based networks, since 1+1 line protection uses two permanent lines to carry the first and second set of voice signals while a phone call is made, whereas data packets in a packet-switched network typically travel along many different routes between the source and destination devices.

Figure 1A:
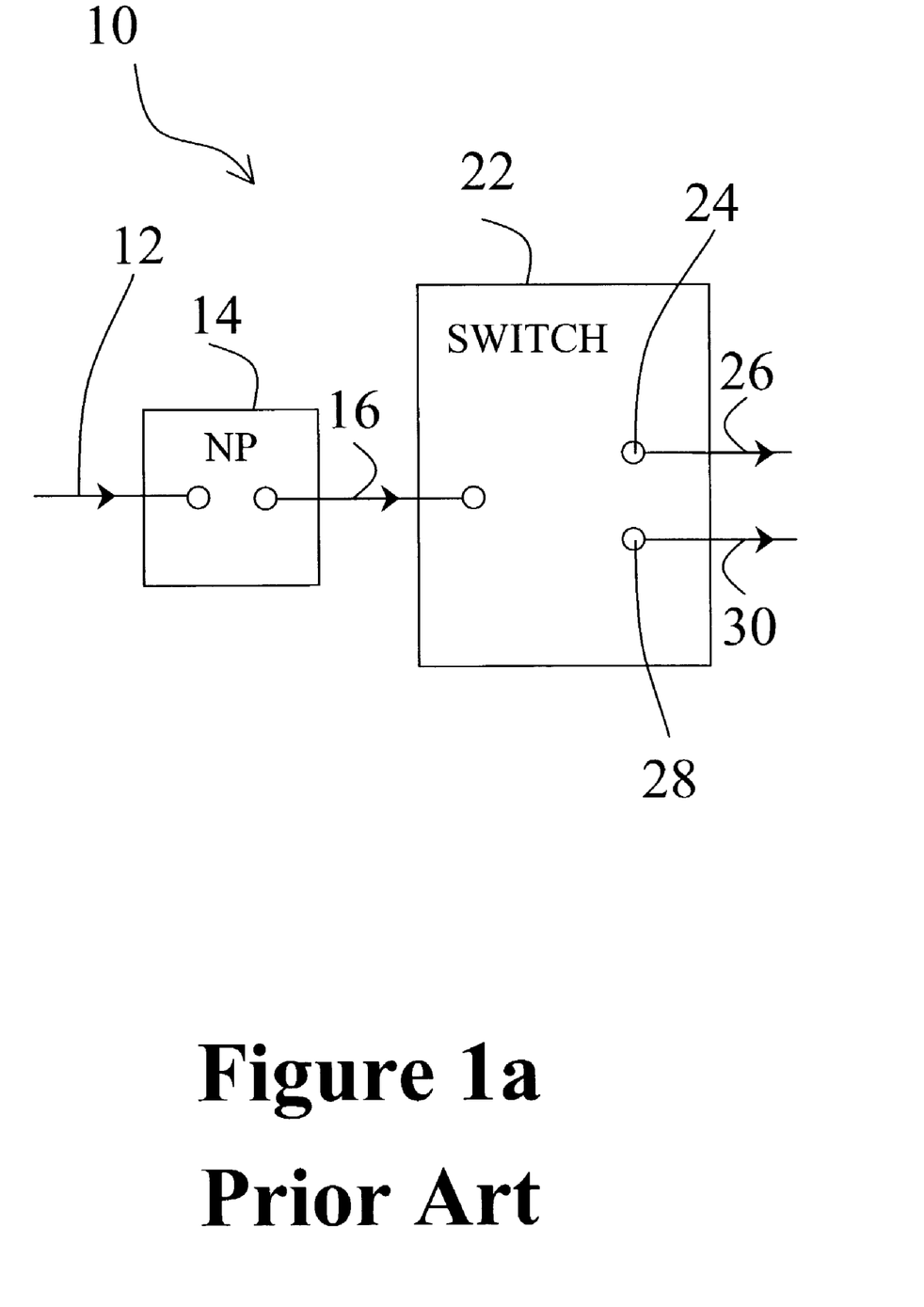
FIG. 1a illustrates a prior art system for 1+1 protection of data communications is a packet network using multicast.

Multicast is commonly used in packet-based networks to provide data communications protection, where data packets are duplicated for transmission on two ports on a target network device, the target port and another port designated as a protection port. In the event that a failure is signaled to the target network device that a fault such as Loss of Signal, Loss of Frame or Bit Error Rate, has occurred downstream from the target port, the network devices use the data from the protection port. FIG. 1a illustrates a typical prior art system 10 for 1+1 protection of data communications in a packet-based network, where a source network device 14 is connected to a target network device 22 by connection 16. In FIG. 1a, the source network device 14 is implemented as a network processor 14 labeled "NP", and the target network device 22 is implemented as a packet-switching device 22, labeled "SWITCH".

There are several methods of multicast protection. One form of the multicast protection is to duplicate each packet on the source network device 14 and to send the original and duplicated packets to the associated target and protection ports respectively. The packets are placed in queues (not shown) for the target network device 22, where the target network device 22 transmits the original packet from the target port 24 via connection 26, and the duplicated packet from the protection port 28 via connection 30.

However, this system requires a powerful source network device (network processor) 14 and twice the bandwidth between the source network device 14 and target network device 22 for 1+1 protection.

In an alternative multicast protection system, packets are not duplicated at the source network device 14, but instead they are duplicated at the target network device 22. Corresponding headers are added to the incoming packet by the source network device 14 so as to inform the target network device 22 to which ports of the device the packet has to be distributed, and the packet is added to a queue for transmission to the target network device 22. At the target network device 22, the multicast packet is duplicated and sent to the target port 24 and to the protection port 28 in case of 1+1 protection.

This method of data communications protection requires a less powerful source network device 14 than the previous method, however as the queue for the transmission between the source network device 14 and target network device 22 is being used for various multicast packets from different sources, contention for buffering on the queue may lead to network performance problems, e.g. may result in jitter for individual data streams such as video or loss of data due to congestion.

Accordingly, there is a need in the telecommunications industry for further development of a cost-effective method for the protection of data communications in packet-based networks which would be more efficient and reduce or eliminate network performance problems.

SUMMARY OF THE INVENTION

It is therefore an object of the invention to provide protection of data communications in packet-based networks which would avoid the above-mentioned drawbacks.

According to one aspect of the invention there is provided a system for 1+1 protection of data communications in a packet-based network, comprising:

means for converting a unicast data packet destined for a target port on a target network device into a multicast data packet, including means for forming a separate queue of the multicast data packets for each pair of ports on the target network device, the first port in the pair being the target port, and the second port in the pair being a protection port associated with the target port.

Additionally, in the system for 1+1 protection of data communications in a packet-based network, the means for conversion further comprises means for transmitting the multicast data packet to the target network device.

Beneficially, in the system for 1+1 protection of data communications in a packet-based network, the means for conversion further comprises means for receiving a congestion signal from the target network device if one of the target and protection port is congested, and means for re-mapping port information in the congestion signal.

Conveniently, in the system for 1+1 protection of data communications in a packet-based network, the means for conversion comprises a Field-Programmable Gate Array (FPGA).

Gainfully, in the system for 1+1 protection of data communications in a packet-based network, the means for conversion comprises a Network Processor.

Beneficially, in the system for 1+1 protection of data communications in a packet-based network, the means for conversion comprises an ASIC.

Additionally, the system for 1+1 protection of data communications in a packet-based network further comprises a target network device for receiving the multicast data packet at the target and the protection port thereof.

Conveniently, in the system for 1+1 protection of data communications in a packet-based network, the target network device is a packet-switching device.

Usefully, the system for 1+1 protection of data communications in a packet-based network further comprises a source network device for generating the unicast data packet.

Advantageously, there is provided a method for providing 1+1 protection of data communications in a packet-based network, comprising the steps of:

converting a unicast data packet destined for a target port on a target network device into a multicast data packet; and forming a queue of the multicast data packets for each pair of ports on the target network device, the first port in the pair being the target port, and the second port in the pair being a protection port associated with the target port.

Gainfully, the method for providing 1+1 protection of data communications in a packet-based network further comprises the step of transmitting the multicast data packet to the target network device.

Beneficially, the method for providing 1+1 protection of data communications in a packet-based network further comprises the step of receiving a congestion signal from the target network device if one of the target and protection port is congested, and the step of re-mapping port information in the congestion signal.

The system and method for 1+1 protection of data communications in a packet-based network summarized above have the advantages of avoiding the contention issues associated with typical multicast solutions that use a general multicast queue for the target network device, and therefore reduces or eliminates network performance problems associated with currently existing solutions.

Additionally, a system for N+1 protection of data communications in a packet-based network is provided, comprising means for converting a unicast data packet destined for a target port on a target network device into a multicast data packet, including means for forming a separate queue of the multicast data packets for each set of ports on the target network device, the first port in the set being the target port, and other ports in the set being protection ports associated with the target port.

Beneficially, the system for N+1 protection of data communications in a packet-based network further comprises means for receiving a congestion signal from the target network device if one of the ports in the set of ports is congested, and means for re-mapping port information in the congestion signal.

Advantageously, in the system for N+1 protection of data communications in a packet-based network, the number of associated protection ports for each target port is the same.

Conveniently, in the system for N+1 protection of data communications in a packet-based network, the number of associated protection ports for each target port is variable between the target ports.

Beneficially, a method for providing N+1 protection of data communications in a packet-based network, comprising the steps of:

converting a unicast data packet destined for a target port on a target network device into a multicast data packet; and forming a queue of the multicast data packets for each set of ports on the target network device, the first port in the set being the target port, and other ports in the set being protection ports associated with the target port.

Advantageously, in the method for providing N+1 protection of data communications in a packet-based network, the means for converting further comprises means for receiving a congestion signal from the target network device if one of the ports in the set of ports is congested, and means for re-mapping port information in the congestion signal.

The system and method for N+1 protection of data communications in a packet-based network have the advantages described above for 1+1 protection, and additionally has the advantage of providing a higher level of reliability of data communications, since more than one port is used to provide protection of data communications.

Beneficially, a system for 1:1 protection of data communications in a packet-based network, comprising:

means for converting a unicast data packet destined for a target port on a target network device into a multicast data packet, including means for forming a queue of the multicast data packets for each pair of ports on the target network device, the first port in the pair being the target port, and second port in the pair being a protection port associated with the target port, the protection port being allowed additionally to carry other data traffic.

Gainfully, in the system for 1:1 protection of data communications in a packet-based network, the means for converting further comprises means for receiving a congestion signal from the target network device if one of the target and protection port is congested, and means for re-mapping port information in the congestion signal.

The system and method for 1:1 protection of data communications in a packet-based network have the advantages described above for 1+1 protection, and additionally provide a cost-effective solution since the protection port may be used for other data traffic when a fault in the target port is not detected, thereby reducing the number of network cards to be purchased.

Advantageously, a system for 1:N protection of data communications in a packet-based network is provided, comprising:

means for converting a unicast data packet destined for a target port on a target network device into a multicast data packet, including means for forming a queue of the multicast data packets for each target port on the target network device;

means for designating at least one associated protection port for all of the target ports; and means for sending multicast data packet to the associated protection port if failure occurs in the transmission to one of the target ports.

Beneficially, in the system for 1:N protection of data communications in a packet-based network, the means for converting further comprises means for receiving a congestion signal from the target network device if one of the target and protection port is congested, and means for re-mapping port information in the congestion signal.

The system and method for 1:N protection of data communications in a packet-based network have the advantages described above for 1:1 protection, and additionally provide lower costs for protection, since more than one target port is associated with the protection port.

BRIEF DESCRIPTION OF THE DRAWINGS

Embodiments of the invention will now be described with reference to the accompanying drawings in which.

DETAILED DESCRIPTION OF THE PREFERRED EMBODIMENTS

Figure 1B:
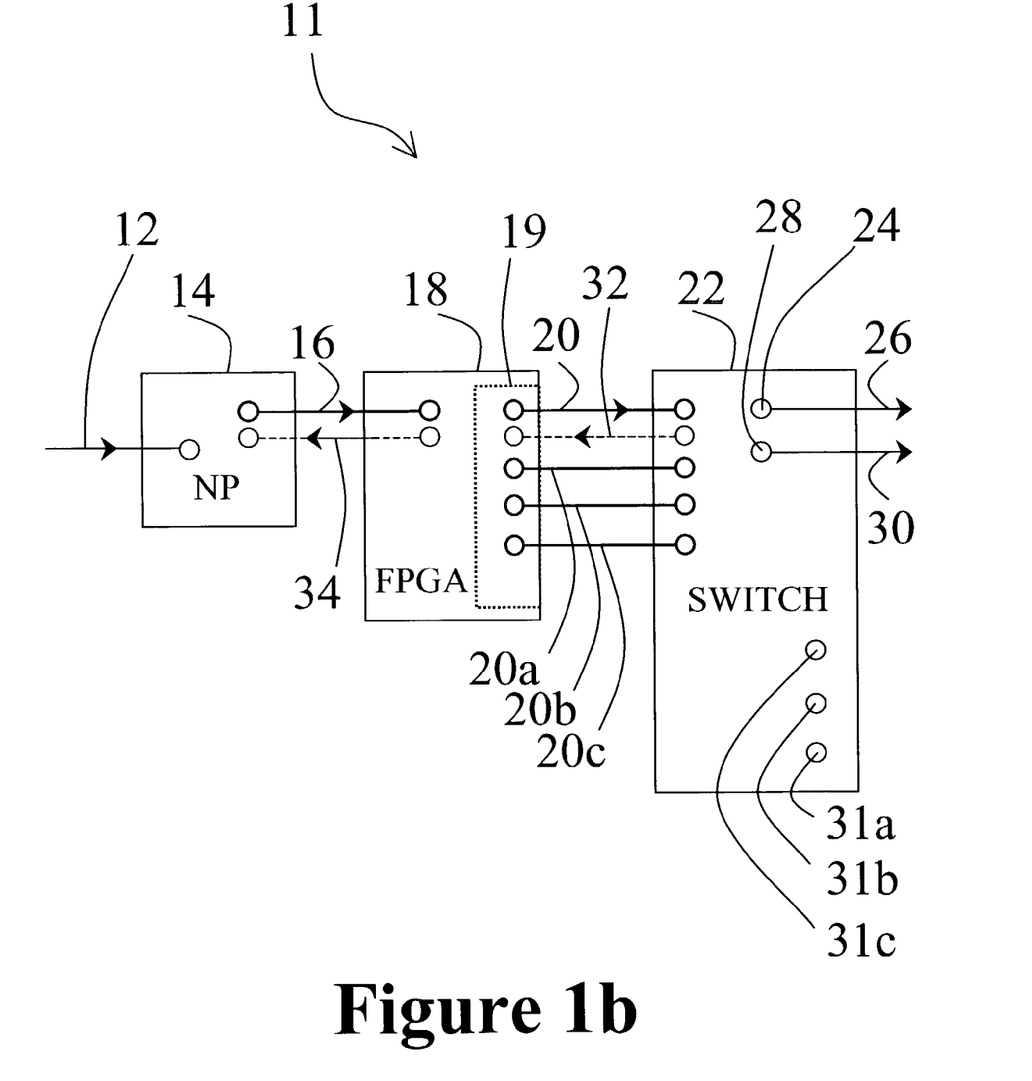
FIG. 1b illustrates a system for 1+1 protection of data communications in a packet network according to a first embodiment of the invention.

FIG. 1b is a diagram illustrating, by means of an example, configuration of a system 11 for 1+1 protection of data communications between a source network device 14 and a target network device 22 in a packet network according to the first embodiment of the invention. Unicast data packets are received on the source network device 14 via connection. The source network device 14 creates Virtual Output Queues (VOQs) for forwarding the unicast data packets. Based on certain criteria, a unicast data packet is received at a port on the source network device 14 via connection 12, and further is sent by a VOQ to a means 18 for conversion into a multicast data packet via connection 16. The means 18 for conversion into a multicast data packet may be implemented as a Field-Programmable Gate Array (FPGA) 18 shown in FIG. 1b, including a memory 19 with programmable logic and look up tables for performing the above mentioned operations. The multicast data packet is further sent to the target network device 22 via connection 20. For a unicast data packet that is converted into a multicast data packet, a logical queue is formed in two parts, where the first part of the logical queue is between the source network device 14 and the means 18 for conversion, and the second part of the logical queue is between the means 18 for conversion and the target network device 22. The FPGA 18 further forwards other unicast and multicast data packets using VOQs 20a, 20b and 20c for other target ports shown as ports 31a, 31b and 31c in FIG. 1b. The target network device 22 receives the multicast data packet and duplicates the packet into two data packets. The first data packet is transmitted by the target network device 22 from a first port 24 using connection 26, and the second data packet is transmitted by the target network device 22 from a second port 28 using connection 30. The first port is the target port 24, and the second port is a protection port 28 associated with the target port 24. If congestion happens in port 24 or port 28, the target network device 22 sends a congestion signal to the FPGA 18 via connection 32, and the FPGA 18 send a corresponding signal to the source network device 14 using connection 34, indicating that the queue is congested and causing suppression of further data packets until an "all-clear" signal is sent. Although illustrated in FIG. 1b as a separate device, the FPGA 18 may be a component of the target network device 22.

Figure 2:
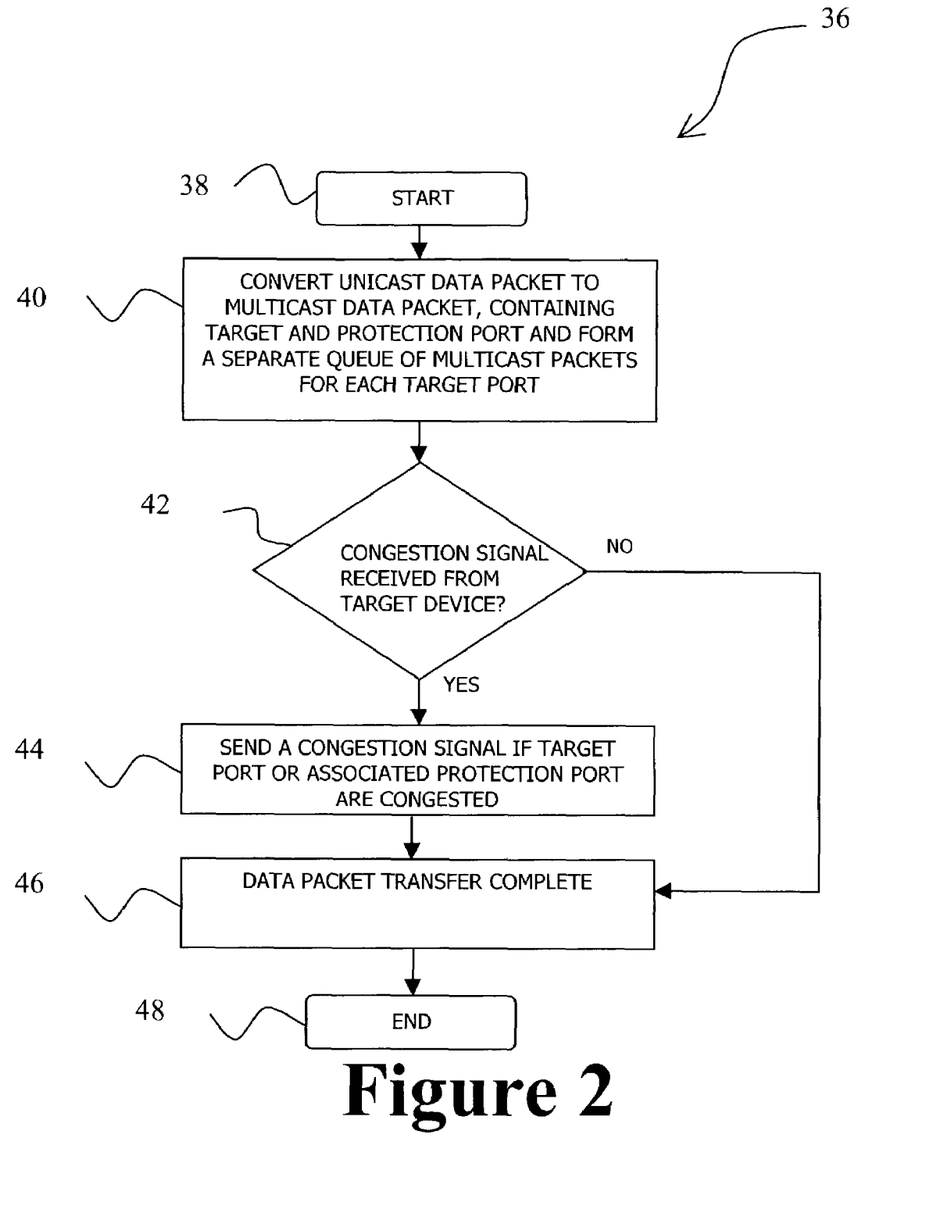
FIG. 2 is a flowchart illustrating a method of providing protection of data communications in a packet network according to the first embodiment of the invention.

A method for providing 1+1 protection of data communications in a packet-based network according to the first embodiment of the invention is illustrated by flowchart 36 in FIG. 2. At the start of the method (box 38), the FPGA 18 receives a unicast data packet from the source network device 14 via a VOQ created by the source network device 14. The received unicast data packet is converted to a multicast data packet (box 40), to be forwarded to two ports, the first port being the target port 24, and the second port being a protection port 28 associated with the target port 24.

Each target port has an associated protection port, and this association is stored in a port information table on the FPGA 18. The multicast data packet is placed in the VOQ for the corresponding target port, for example target port 24, and transmitted to the target network device 22. If either or both of the target port 24 or the protection port 28 becomes congested, e.g. because of the imperfections of the buffering system at the target network device 22, a congestion signal is sent by the target network device 22 to the FPGA 18 (box 42). The congestion signal includes a port identifier, which refers to the congested port. If necessary, a combinatorial analysis is performed on incoming congestions signals so that the port identifier in the congestion signal is re-mapped into the target port at the FPGA 18 by looking up the port identifier in the port information table (box 44). The combinatorial analysis can be a direct swap, a logical "AND" or a logical "OR" of the two ports. Such a re-mapping is required because the source network device 14 is aware only about target ports on the target network device 22 and has no information about protection ports associated with a given target port. The corresponding (and if necessary re-mapped) congestion signal is sent from the FPGA 18 to the source network device 14, followed by completion of data transfer (box 46) and termination of the method (box 48). If the congestion signal is not received from the target network device 22 (exit NO from box 42), the data transfer is considered to be complete (box 46), and the method is terminated (box 48).

Figure 3:
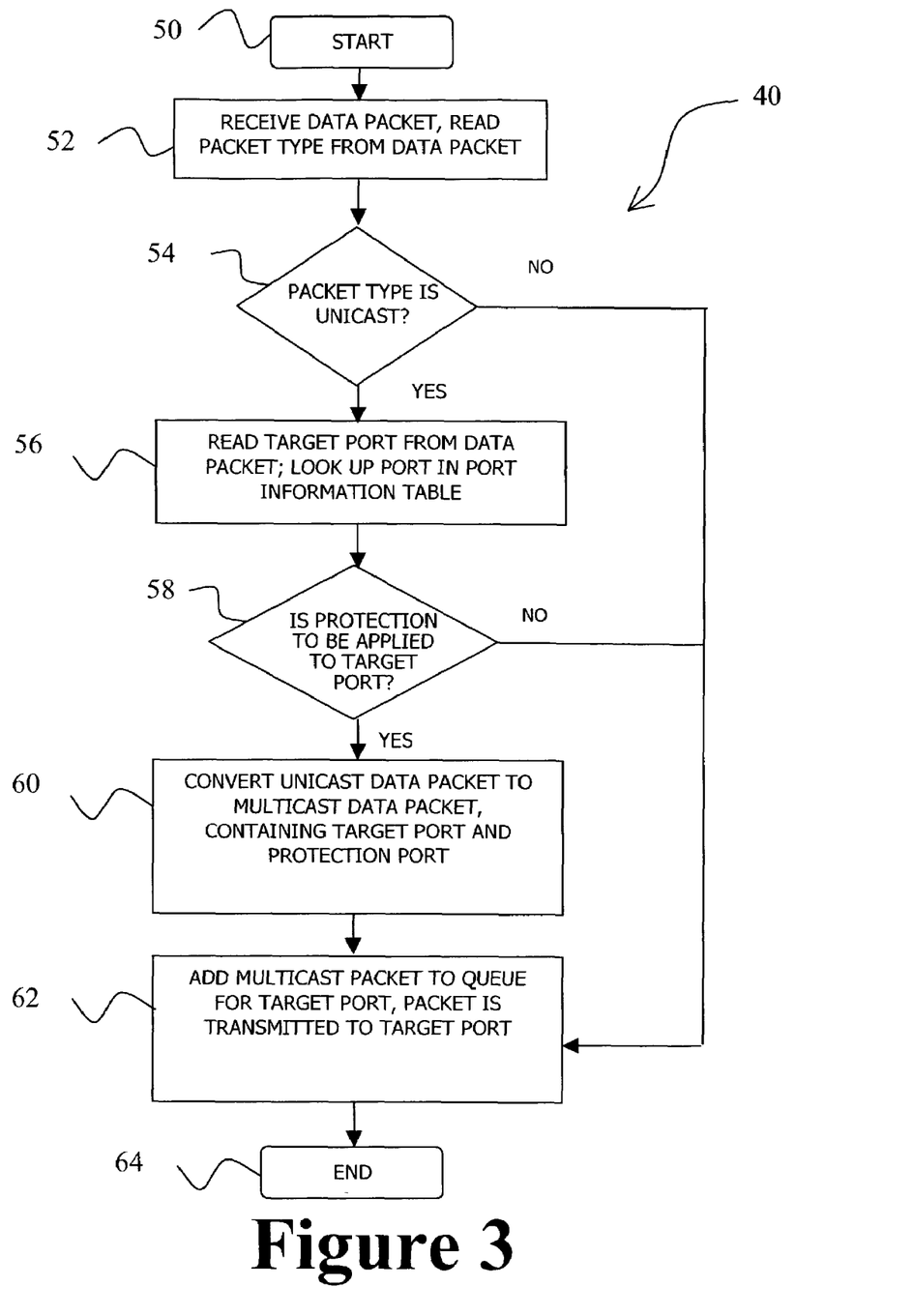
FIG. 3 is a flowchart illustrating the step 40 of conversion of a unicast packet into a multicast packet of FIG. 2 in more detail.

Flowchart 40 in FIG. 3 illustrates the step 40 of conversion of a unicast data packet to a multicast data packet of FIG. 2 in more detail. At the start of the conversion (box 50), a data packet is received and examined, and the packet type is read (box 52). If the data packet is marked as a unicast data packet (exit YES from box 54), the target port is read from the data packet, and the FPGA 18 looks up the target port in a port information table (box 56) to determine the protection port associated with the target port (if protection to be applied to the target port). If protection has to be applied to the target port (exit YES from box 58), the unicast data packet is converted to a multicast data packet (box 60), for distribution to two ports, wherein the first port is the protection port associated with the target port (box 56), and the second port is the target port read from the data packet (box 56). The last step is to add the multicast data packet to a VOQ for the target port for transmission to the target network device 22 (box 62) for distribution to the target and protection ports, followed by the completion of the process (box 64). The FPGA 18 converts unicast data packets to multicast data packets, thereby reducing or avoiding a potential congestion between the source network device 14 and the target network device 22, and thus avoiding or reducing the drawbacks associated with existing solutions for protection of data communications in packet-based networks where a single multicast queue is being used. If the packet is not marked as a unicast data packet (exit NO from box 54), protection is not to be applied to the unicast data packet (exit NO from box 58), and the data packet is sent to the target network device without conversion (box 62), followed by the completion of the process (box 64).

Figure 4:
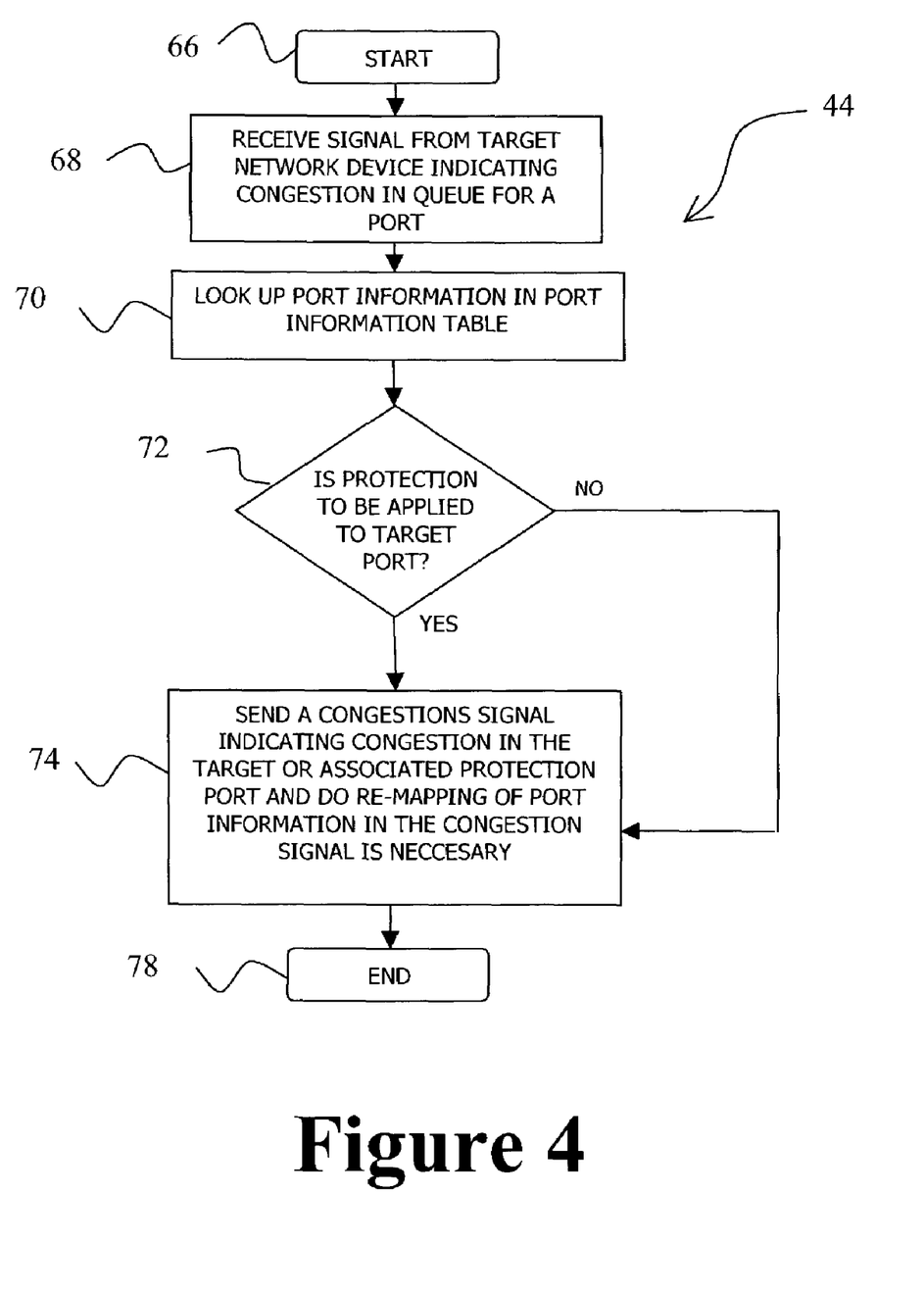
FIG. 4 is a flowchart illustrating the step 44 of sending a congestion signal from the target network device to the source network device of FIG. 2 in more detail.

Flowchart 44 shown in FIG. 4 illustrates the step 44 of FIG. 2 of sending the congestion signal from the target network device 22 to the source network device 22 in more detail. At the start (box 66), a congestion signal is received at the FPGA 18 from the target network device 22, indicating congestion for a port (box 68). The FPGA 18 looks up the congested port in a port information table (box 70) that contains the port type for a port. If the protection is to be applied to the target port, i.e. if the port type is a protection port 28, (exit YES from box 72), then, in order to suppress further data transfer until the queue for the associated target port 24 is no longer congested, the source network device 14 needs to receive a congestion signal indicating that the queue for the associated target port 24 is congested (box 74). For this reason, a combinatorial analysis of congestion signals received from the target network device 22 is performed, so that the FPGA 18 re-maps the protection port 28 identifier in a congestion signal to the associated target port 24 (included in box 74), and sends the congestion signal to the source network device 14 (box 76), followed by the completion of the process (box 78). The combinatorial analysis can be a direct swap, a logical "AND" or a logical "OR" of the two ports. If the signal indicates congestion for the target port 24 (exit NO from box 72), the signal is sent directly to the source network device 14 without re-mapping the port information (box 76), followed by the completion of the process (box 78).

Thus, a method for 1+1 protection of data communications in a packet-based network is provided that provides the use of an output queue for each target port, avoids the issues associated with typical multicast solutions that use a general multicast queue for the target network device, and therefore reduces or eliminates network performance problems associated with currently existing solutions.

Figure 5:
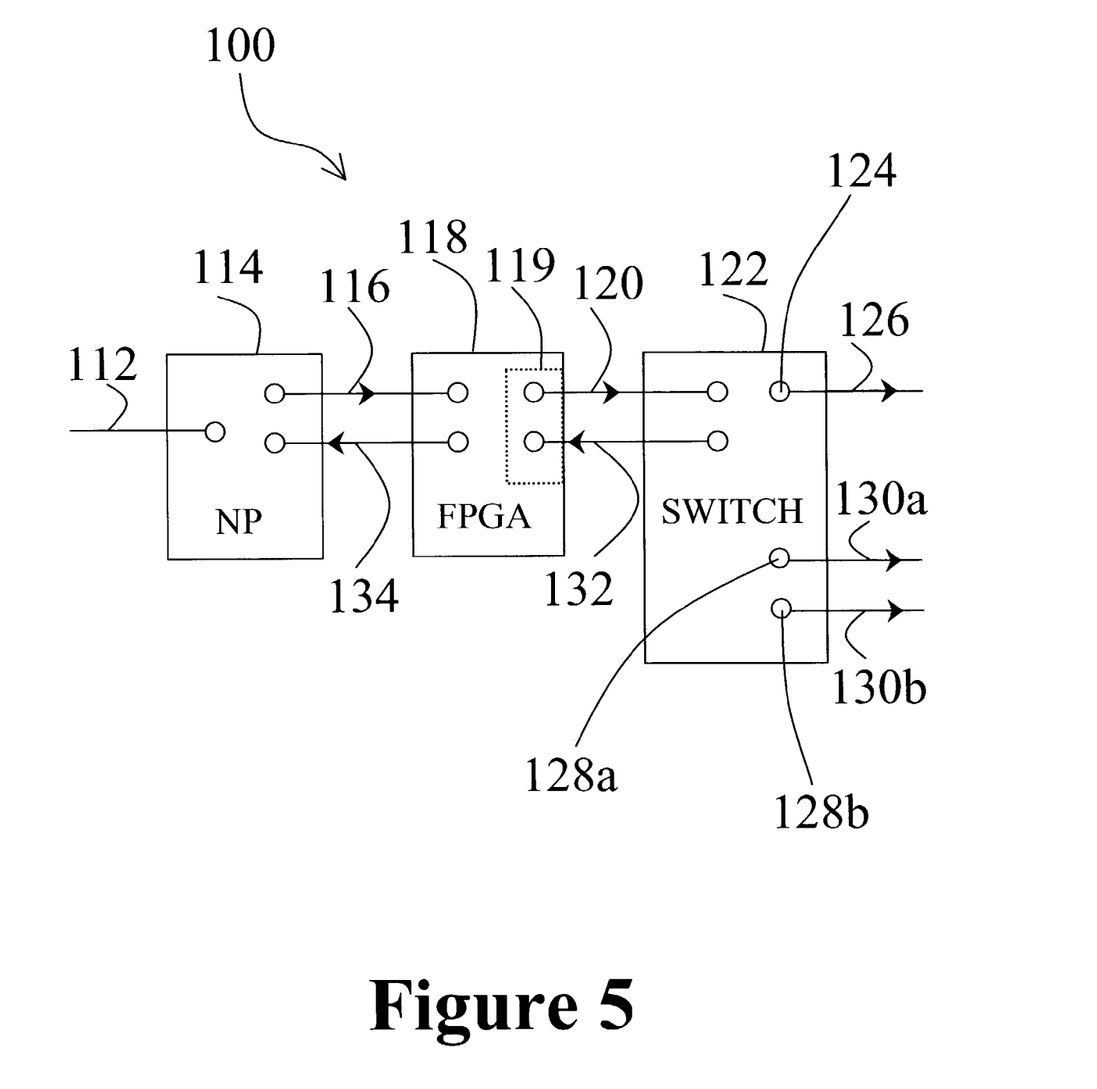
FIG. 5 illustrates a system for 2+1 protection of data communications in a packet network according to a second embodiment of the invention.

FIG. 5 is a diagram illustrating, by means of an example, configuration of a system 100 for providing 2+1 protection of data communications in a packet network according to a second embodiment of the invention. The system 100 is similar to the system configuration 11 of the first embodiment, except for the unicast data packet being converted into a multicast data packet for distribution to three target ports to provide N+1 protection, where N=2. Similar elements in FIGS. 1 and 5 are designated by the same reference numerals, incremented by 100. The unicast data packet is converted into a multicast data packet for distribution to three target ports, the first port being the target port 124 with a target connection 126, and the other two ports being protection ports 128a and 128b associated with the target port 124 with two protection connections 130a and 130b, respectively. The FPGA 118 receives a unicast data packet from source network device 114 and converts it into a multicast data packet to be sent to the target network device 122 and to be distributed within the target network device 122 to three ports, the first port being the target port 224, and the second and third ports being protection ports 128a and 128 respectively. The FPGA 118 also includes a memory 119 with embedded computer code for forming and managing a separate queue of multicast packet for each target port on the target network device 122. If one of the first, second or third ports becomes congested, a congestion signal for the queue is sent by the target network device 122 and received by the FPGA 118. If the congestion signal is for the protection port 128a or 128b, the port identifier in the signal is re-mapped into the associated target port 124 by looking up the port identifier in the port information table, and the congestion signal is sent to the source network device 114. If the congestion signal is for the target port 124, the congestion signal is sent to the source network device 14 by the FPGA 118 without re-mapping of the port information in the signal.

Thus, an efficient method for N+1 protection of data communications in packet-based networks is provided that provides the formation and use of a queue for each target port between the FPGA and the target network device, that avoids the issues associated with typical multicast solutions that use a general multicast queue for the target network device, and avoids or reduces congestion problems associates with current solutions.

Figure 6:
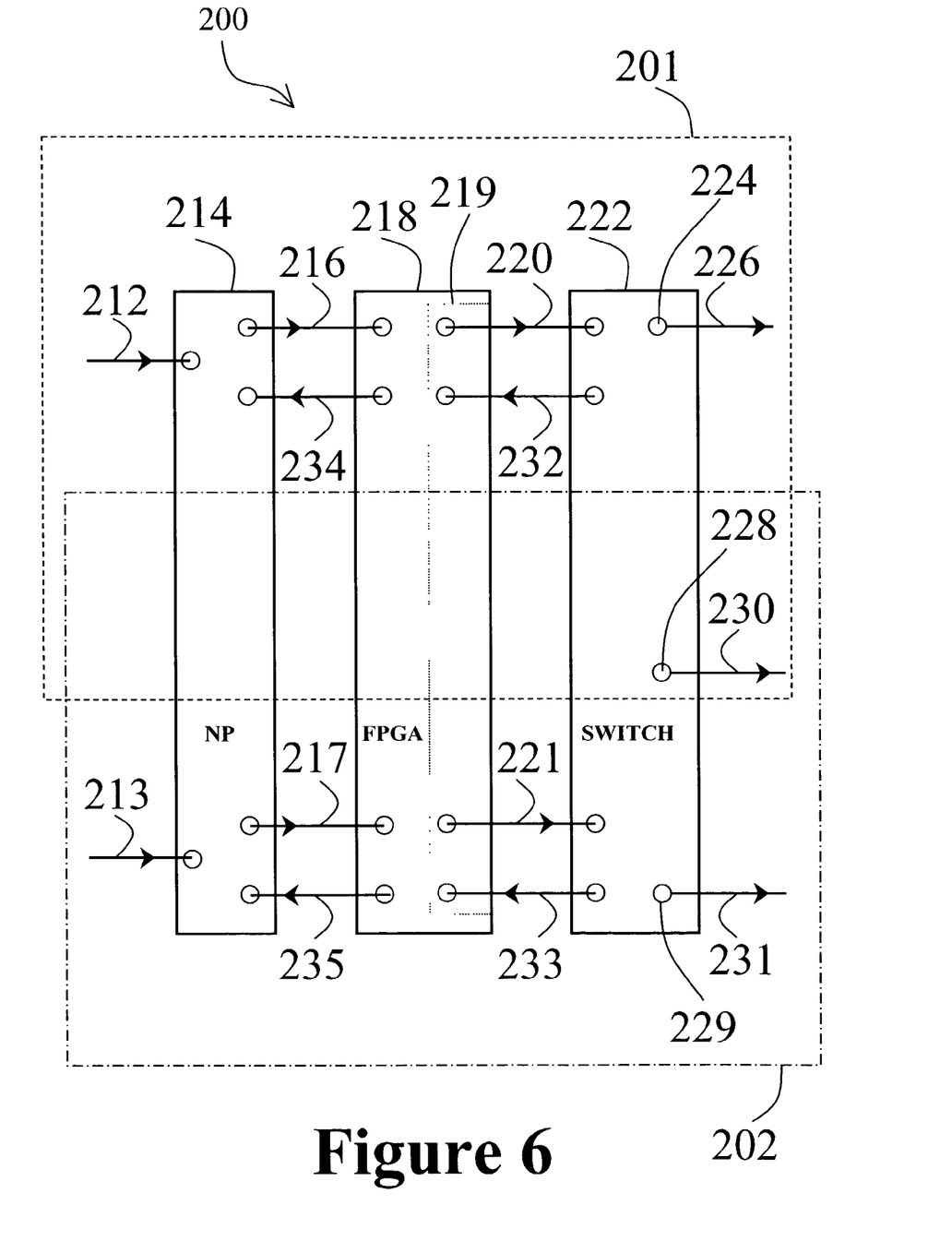
FIG. 6 illustrates a system for 1:1 protection of data communications in a packet network according to a third embodiment of the invention.

FIG. 6 is a diagram illustrating, by means of an example, a configuration of a system 200 for providing 1:1 protection of data communications in a packet network according to a third embodiment of the invention. The system 200 is similar to that of the first embodiment, where similar elements in FIGS. 1 and 6 are designated by the same reference numerals, incremented by 200 respectively. System 200 operates in the following manner. Port 224 is used as a target port, and port 228 is used as the protection port for the multicast of data received at connection 212. When a fault is detected at port 224, port 228 is used for transmission of data received at port 212. When port 228 is not being used for transmission of data received at port 212, port 228 may be used for other transmission of other multicast traffic. If port 228 is congested, the target network device 222 sends a congestion signal to the FPGA 218, where the FPGA 218 looks up the port type in a port information table, and the port is re-mapped to the associated target port 224 in the congestion signal to be sent further to the source network device 214. It means if port 228 is being used to transmit data received at connection 212, then the associated target port is port 224, and the congestion is sent to the source network device 214 with a congestion port identifier 224.

Thus, an efficient method for 1:1 protection of data communications in packet-based networks is provided that provides formation and use of multiple output queues for each target port and avoids or reduces network performance problems associated with other known solutions.

In a modification to the first embodiment, the means 18 for conversion may be implemented as an application-specific integrated circuit (ASIC), and may be a component of the source network device 14.

In another modification to the third embodiment, a method and system for 1:N protection of data communications may be provided, wherein the sub-system 200 is replicated (N−1) times, each of the sub-systems operating in the manner described above.

In a further modification to the system of the embodiments of the invention, it is possible, for each target port, to designate a number of associated protection ports, the number being the same or variable between the target ports.

Although specific embodiments of the invention have been described in detail, it will be apparent to one skilled in the art that variations and modifications to the embodiments may be made within the scope of the following claims.

What is claimed is:

1. A system for protection of data communications from a first device to a second device in a network, said system comprising:
    means for pairing output ports of said second device into port pairs, each port pair comprising a primary port and a secondary port;
    means for creating queues at said first device, each queue associated with a primary port in said second device; and
    an intermediate device communicatively coupled to said first device and said second device, said intermediate device maintaining a table of said port pairs and having means for converting a data packet destined for a primary port in a specific port pair of said second device into a multicast data packet destined to said specific port pair.

2. The system of claim 1 further comprising means for transmitting the multicast data packet to the second device.

3. The system of claim 1 wherein the means for converting further comprises means for receiving a congestion signal indicating a congestion status of said specific port pair from the second device.

4. The system of claim 1 wherein the means for converting comprises a Field-Programmable Gate Array (FPGA).

5. The system of claim 1 wherein the means for converting comprises a Network Processor.

6. The system as described in of claim 1 wherein the means for converting comprises an application-specific integrated circuit.

7. The system of claim 2 wherein said second device comprises means for multicasting.

8. The system of claim 7 wherein the second device is a packet-switching device.

9. The system of claim 7 wherein said first device comprises means for assigning a protection level to a data packet.

10. A method for providing protection of data communications from a first device to a second device in a network, comprising the steps of:
    converting a unicast data packet destined for a target port on said second device into a multicast data packet directed to a pair of ports comprising said target port and a protection port associated with said target port in said second device; and
    placing the multicast data packet in a queue dedicated to said pair of ports.

11. The method of claim 10 further comprising a step of transmitting the multicast data packet to the second device.

12. The method of claim 11 further comprising a step of receiving a congestion signal from the second device indicating a congestion status of said pair of ports.

13. A system for protection of data communications from a first device to a second device in a packet-based network, said system comprising:
    means for grouping output ports of said second device into port sets, each port set comprising a primary port and at least one secondary port;
    means for creating queues at said first device, each queue associated with a primary port in said second device; and
    an intermediate device communicatively coupled to said first device and said second device, said intermediate device maintaining a table of said port sets and having means for converting a data packet destined for a primary port in a specific port set of said second device into a multicast data packet destined to said specific port set.

14. The system of claim 13 wherein the means for converting further comprises means for receiving a congestion signal indicating a congestion status of said specific port pair from second device, and means for re-mapping port information in the congestion signal.

15. The system of claim 13 wherein said port sets comprise equal numbers of ports.

16. The system of claim 13 wherein at least two port sets comprise different numbers of ports.

17. A method for providing protection of data communications from a first device to a second device in a network, comprising the steps of:
    converting a unicast data packet destined for a target port on said second device into a multicast data packet directed to a set of ports comprising said target port and at least one protection port associated with said target port in said second device; and
    placing the multicast data packet in a queue dedicated to said set of ports.

18. The method of claim 17, further comprising a step of receiving a congestion signal from the target network device indicating that one of the ports in the set of ports is congested, and a step of re-mapping port information in the congestion signal.

19. A system for protection of data communications from a first device to a second device in a network, said system comprising:
    means for pairing output ports of said second device into port pairs, each port pair comprising a primary port and a secondary port wherein at least two port pairs have a common secondary port;
    means for creating queues at said first device, each queue associated with a primary port in said second device; and
    an intermediate device communicatively coupled to said first device and said second device, said intermediate device maintaining a table of said port pairs and having means for converting a data packet destined for a target primary port in a specific port pair of said second device into a multicast data packet destined to said specific port pair
    wherein said common secondary port is allowed additionally to carry other multicast traffic.

20. The system as described in of claim 19 wherein the means for converting further comprises means for receiving a congestion signal from the second device indicating that one of the target primary port and secondary port of said specific port pair is congested, and means for re-mapping port information in the congestion signal.

21. A system for protection of data communications from a first device to a second device in a network, said system comprising:
    means for grouping output ports of said second device into target ports and at least one protection port;
    means for creating queues at said first device, each queue associated with a target port in said second device; and
    an intermediate device communicatively coupled to said first device and said second device, said intermediate device maintaining a table of said target ports and said at least one protection port and having means for converting a data packet destined for a target port of said second device into a multicast data packet destined to said target port and a specific protection port from among said at least one protection port.

22. The system as described in of claim 21 wherein the means for converting further comprises means for receiving a congestion signal from the second device indicating that one of the target port and the specific protection port is congested, and means for re-mapping port information in the congestion signal.

* * * * *